(12) United States Patent
Yuan

(10) Patent No.: US 12,108,104 B2
(45) Date of Patent: Oct. 1, 2024

(54) SPLIT-SCREEN PLAYBACK METHOD, APPARATUS AND DEVICE FOR LOCK SCREEN VIDEO, AND STORAGE MEDIUM

(71) Applicant: Beijing Wodong Tianjun Information Technology Co., Ltd., Beijing (CN)

(72) Inventor: Yumin Yuan, Beijing (CN)

(73) Assignee: Beijing Wodong Tianjun Information Technology Co., Ltd., Beijing (CN)

( * ) Notice: Subject to any disclaimer, the term of this patent is extended or adjusted under 35 U.S.C. 154(b) by 202 days.

(21) Appl. No.: 17/505,248

(22) Filed: Oct. 19, 2021

(65) Prior Publication Data

US 2022/0078512 A1 Mar. 10, 2022

Related U.S. Application Data

(63) Continuation of application No. PCT/CN2020/079995, filed on Mar. 18, 2020.

(30) Foreign Application Priority Data

May 7, 2019 (CN) .......................... 201910374011.9

(51) Int. Cl.
*H04N 21/43* (2011.01)
*G11B 20/00* (2006.01)
*G11B 27/36* (2006.01)
*H04N 5/262* (2006.01)
(Continued)

(52) U.S. Cl.
CPC . *H04N 21/43072* (2020.08); *G11B 20/00007* (2013.01); *G11B 27/36* (2013.01);
(Continued)

(58) Field of Classification Search
CPC .......... H04N 21/43072; H04N 5/2624; H04N 21/41407; H04N 21/4882; H04N 21/4314;
(Continued)

(56) References Cited

U.S. PATENT DOCUMENTS

| 8,719,857 B1 | 5/2014 | Ellis et al. |
| 2005/0094966 A1 | 5/2005 | Elberbaum |

(Continued)

FOREIGN PATENT DOCUMENTS

| CN | 103957447 | 7/2014 |
| CN | 104010230 | 8/2014 |

(Continued)

OTHER PUBLICATIONS

The Office Action for Chinese Patent Application No. 201910374011. 9, dated Sep. 3, 2021.
(Continued)

*Primary Examiner* — Girumsew Wendmagegn

(57) ABSTRACT

The present disclosure provides a split-screen playback method, apparatus and device for lock screen video and a storage medium. The method includes: monitoring whether a screen enters a screen-locked state; upon monitoring that the screen enters a screen-locked state, obtaining at least two video files; playing the video files on different display areas of the screen, respectively; wherein a number of the display areas is consistent with a number of the video files. The present disclosure can implement split-screen playback for lock screen video without changing hardware of a terminal, thereby effectively improving the playback efficiency of the video, facilitating popularization and application, and providing good user experience.

15 Claims, 10 Drawing Sheets

(51) Int. Cl.
*H04N 21/414* (2011.01)
*H04N 21/488* (2011.01)

(52) U.S. Cl.
CPC ..... *H04N 5/2624* (2013.01); *H04N 21/41407* (2013.01); *H04N 21/4882* (2013.01); *G11B 2020/00072* (2013.01)

(58) Field of Classification Search
CPC ........... H04N 21/4438; H04N 21/4821; H04N 21/812; H04N 21/4312; H04N 21/440218; H04N 21/4424; H04N 21/472; G11B 20/00007; G11B 27/36; G11B 2020/00072; G11B 27/34
See application file for complete search history.

(56) References Cited

U.S. PATENT DOCUMENTS

| | | | |
|---|---|---|---|
| 2016/0110028 A1 | 4/2016 | Choi | |
| 2018/0139317 A1* | 5/2018 | Lee | H04M 1/724634 |
| 2020/0388089 A1* | 12/2020 | Yang | H04N 7/183 |

FOREIGN PATENT DOCUMENTS

| | | |
|---|---|---|
| CN | 104375742 | 2/2015 |
| CN | 104780418 | 7/2015 |
| CN | 105407323 A | 3/2016 |
| CN | 106126027 | 11/2016 |
| CN | 104750384 B | 3/2017 |
| CN | 106559560 | 4/2017 |
| CN | 106648325 | 5/2017 |
| CN | 106713596 | 5/2017 |
| CN | 106878736 | 6/2017 |
| CN | 106993212 A | 7/2017 |
| CN | 107483882 A | 12/2017 |
| CN | 104683561 B | 7/2018 |
| WO | 2014/088350 A1 | 6/2014 |

OTHER PUBLICATIONS

Internal Search Report dated Jun. 8, 2020 for International application No. PCT/CN2020/079995.

* cited by examiner

SPLIT-SCREEN PLAYBACK METHOD, APPARATUS AND DEVICE FOR LOCK SCREEN VIDEO, AND STORAGE MEDIUM

CROSS-REFERENCES TO RELATED APPLICATIONS

The present application is a continuation of International Application No. PCT/CN2020/079995, filed on Mar. 18, 2020, which claims priority to Chinese Patent Application No. 201910374011.9, and entitled "SPLIT-SCREEN PLAYBACK METHOD, APPARATUS AND DEVICE FOR LOCK SCREEN VIDEO, AND STORAGE MEDIUM", filed with the China Patent Office on May 7, 2019, the contents of the aforementioned applications are hereby incorporated by reference in their entities.

TECHNICAL FIELD

The present disclosure relates to the field of electronic technology, and in particular to a split-screen playback method, apparatus and device for lock screen video, and a storage medium.

BACKGROUND

With the continuous development of electronic technology, smart terminals such as mobile phones and tablets have become an indispensable part of people's life. Logging in to various video clients or video portals to watch videos through smart terminals has become a common way of entertainment in people's life.

SUMMARY

In a first aspect, an embodiment of the present disclosure provides a split-screen playback method for lock screen video, including:
  monitoring whether a screen enters a screen-locked state;
  upon monitoring that the screen enters the screen-locked state, obtaining at least two video files; and
  playing the video files on different display areas of the screen, respectively: where a number of the display areas is consistent with a number of the video files.

In a possible design, monitoring whether the screen enters the screen-locked state includes:
  triggering generation of a system broadcast when the screen is off; and
  monitoring whether the screen is in a screen-off state through the system broadcast; and determining that the screen enters the screen-locked state if the screen is in the screen-off state.

In a possible design, playing the video files on different display areas of the screen, respectively, includes:
  determining video information of each video file, the video information including: a video width, a video height, coordinates of an upper left corner of video, and a video volume state; the video volume state including: a mute state and a non-mute state;
  starting decoding threads running in parallel, and converting the video files into corresponding video images according to the video information of each video file: where a number of the decoding threads is consistent with the number of the video files; and
  displaying the video images on the different display areas of the screen.

In a possible design, converting the video files into the corresponding video images according to the video information of each video file includes:
  registering a ffmpeg codec;
  inputting a file list corresponding to the video files;
  starting a mutual exclusion lock used to lock control instructions of different decoding threads;
  opening all the video files through the decoding threads running in parallel;
  releasing the mutual exclusion lock; and
  encapsulating a frame decoding process of the video files and releasing the ffmpeg codec to obtain the corresponding video images.

In a possible design, after playing the video files on different display areas of the screen, respectively, further include:
  responding to a first operation signal input by a user, and controlling a playback state of any display area to be a full-screen playback state according to the first operation signal: where, when in the full-screen playback state, playing of the video files corresponding to other hidden display areas is paused; and
  responding to a second operation signal input by a user, and switching from the full-screen playback state to a split-screen playback state according to the second operation signal.

In a possible design, after playing the video files on different display areas of the screen, respectively, further include:
  receiving a notification and displaying the notification in a message bar; where the message bar is located above or below the display areas; and
  responding to a third operation signal of a user on the message bar, and entering an application interface corresponding to the notification from the screen-locked state according to the third operation signal.

In a possible design, after playing the video files on different display areas of the screen, respectively, further include:
  responding to a fourth operation signal input by a user, and entering an unlocked state from the screen-locked state according to the fourth operation signal: where the fourth operation signal refers to: a sliding signal that is sensed in a preset area and greater than an unlocking distance; and
  saving current playback addresses, playback progress, and video information of the video files.

In a possible design, further include:
  when entering the screen-locked state next time, continuing to play the video files according to the saved current playback addresses, playback progress, and video information of the video files.

In a second aspect, an embodiment of the present disclosure provides a split-screen playback apparatus for lock screen video, including:
  a monitoring module, configured to monitor whether a screen enters a screen-locked state;
  an obtaining module, configured to obtain at least two video files upon monitoring that the screen enters the screen-locked state; and
  a playing module, configured to play the video files on different display areas of the screen: where a number of the display areas is consistent with a number of the video files.

In a possible design, the monitoring module is specifically configured to:
trigger generation of a system broadcast when the screen is off; and
monitor whether the screen is in a screen-off state through the system broadcast; and determine that the screen enters the screen-locked state if the screen is in the screen-off state.

In a possible design, the playing module is specifically configured to:
determine video information of each video file, the video information including: a video width, a video height, coordinates of an upper left corner of video, and a video volume state: the video volume state including: a mute state and a non-mute state;
start decoding threads running in parallel, and convert the video files into corresponding video images according to the video information of each video file; where a number of the decoding threads is consistent with the number of the video files; and
display the video images on the different display areas of the screen.

In a possible design, converting the video files into corresponding video images according to the video information of each video file includes:
registering a ffmpeg codec;
inputting a file list corresponding to the video files;
starting a mutual exclusion lock used to lock control instructions of different decoding threads;
opening all the video files through the decoding threads running in parallel;
releasing the mutual exclusion lock;
encapsulating a frame decoding process of the video files and releasing the ffmpeg codec to obtain the corresponding video images.

In a possible design, a processing module is further included, which is configured to:
respond to a first operation signal input by a user, and control a playback state of any display area to be a full-screen playback state according to the first operation signal; where, when in the full-screen playback state, playing of the video files corresponding to other hidden display areas is paused;
respond to a second operation signal input by a user, and switch from the full-screen playback state to a split-screen playback state according to the second operation signal.

In a possible design, a processing module is further included, which is configured to:
receive a notification and display the notification in a message bar; where the message bar is located above or below the display areas;
respond to a third operation signal of a user on the message bar, and enter an application interface corresponding to the notification from the screen-locked state according to the third operation signal.

In a possible design, further include:
an unlocking module, configured to respond to a fourth operation signal input by a user, and enter an unlocked state from the screen-locked state according to the fourth operation signal: where the fourth operation signal refers to: a sliding signal that is sensed in a preset area and greater than an unlocking distance; and
a storage module, configured to save current playback addresses, playback progress and video information of the video files.

In a possible design, the playing module is further configured to:
when the screen-locked state is entered next time, continue to play the video files according to the saved current playback addresses, playback progress, and video information of the video files.

In a third aspect, an embodiment of the present disclosure provides a split-screen playback device for lock screen video, including: a memory and a processor, the memory having executable instructions stored therein: where the processor is configured to execute the executable instructions to execute the split-screen playback method for lock screen video according to any one of the first aspect.

In a fourth aspect, an embodiment of the present disclosure provides a computer-readable storage medium with a computer program stored thereon, where the program is executed by a processor to implement the split-screen playback method for lock screen video according to any one of the first aspect.

In a fifth aspect, an embodiment of the present disclosure provides a program product, the program product includes: a computer program stored in a readable storage medium, at least one processor of a device can read the computer program from the readable storage medium, and the at least one processor executes the computer program to cause the device to execute the split-screen playback method for lock screen video according to any of the first aspect.

BRIEF DESCRIPTION OF DRAWINGS

In order to more clearly explain the technical solutions of the embodiments of the present disclosure or in the related art, the following will briefly introduce the accompanying drawings that need to be used in the description of the embodiments or the related art. It is obvious that the accompanying drawings in the following description are some embodiments of the present disclosure. For those skilled in the art, other drawings may also be obtained based on these drawings without creative effort.

Figure 1:
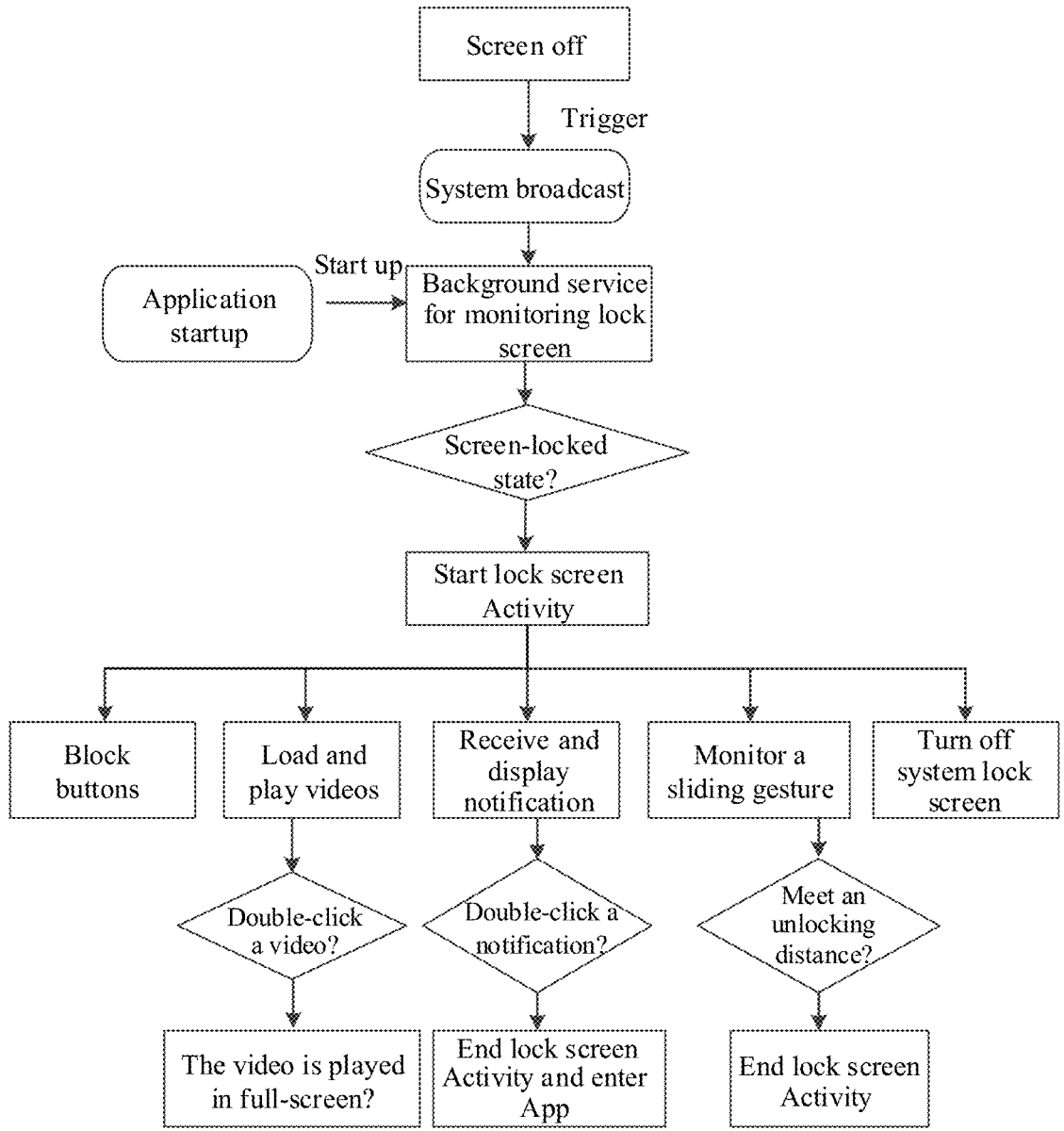
FIG. 1 is a schematic diagram of a principle of an application scenario of the present disclosure.

Through the above drawings, specific embodiments of the present disclosure have been shown and will be described in more detail later. These drawings and text descriptions are not intended to limit the scope of the concept of the present disclosure in any way, but to explain the concept of the present disclosure for those skilled in the art by referring to specific embodiments.

DESCRIPTION OF EMBODIMENTS

In order to make the purpose, technical solutions and advantages of the embodiments of the present disclosure clearer, the technical solutions in the embodiments of the present disclosure will be described below clearly and completely in combination with the accompanying drawings in the embodiments of the present disclosure. Obviously, the described embodiments are part of the embodiments of the present disclosure, not all of the embodiments. Based on the embodiments of the present disclosure, all other embodiments obtained by those of ordinary skilled in the art without creative effort belong to the protection scope of the present disclosure.

The terms "first", "second", "third", "fourth", etc. (if any) in the description and claims of the present disclosure and the above drawings are used to distinguish similar objects, and do not need to be used to describe a specific order or sequence. It should be understood that the data used in this way can be interchanged under appropriate circumstances, so that the embodiments of the present disclosure described herein can be implemented in an order other than those illustrated or described here. In addition, the terms "include" and "have" and any variation thereof are intended to cover non-exclusive inclusion, for example, a process, method, a system, a product or a device that including a series of steps or units is not necessarily limited to those clearly listed, but may include other steps or units not clearly listed or inherent to the process, method, product or device.

In order to facilitate the understanding of the technical solutions, technical terms appearing in the present disclosure are explained.

1) FFmpeg: free software that can run recording, conversion and streaming functions in multiple formats of audio and video, including libavcodec and libavformat, where libavcodec is a decoder library for audio and video in multiple projects, and libavformat is an audio and video format conversion library.

2) AVFrame structure: generally used to store raw data (i.e., uncompressed data, such as YUV and RGB for video and PCM for audio). In addition, it also contains some relevant information. For example, data such as macroblock type table, QP table and motion vector table are stored during decoding. Relevant data is also stored during encoding.

The technical solutions of the present disclosure are described in detail below with specific embodiments. The following specific embodiments may be combined with each other, and the same or similar concepts or processes may not be repeated in some embodiments.

With the continuous development of electronic technology, smart terminals such as mobile phones and tablets have become an indispensable part of people's life. Logging in to various video clients or video portals to watch videos through smart terminals has become a common way of entertainment in people's life.

At present, when a terminal is in a screen-locked state, it can continue to play video by maintaining running of a background thread. However, existing video playback technology can only play a single video on a lock screen interface, which has low video playback efficiency and poor advertising effect. Therefore, in order to further improve advertising efficiency, a scheme of split-screen play back for video in a screen-locked state is designed.

However, the existing split-screen play back technology for lock screen video requires a lot of changes to hardware and software layers of the terminal, and the production cost is high, which is not conducive to popularization and use.

Therefore, the present disclosure provides a split-screen play back method for lock screen video, which can implement split-screen playback for lock screen video without changing hardware of a terminal, thereby effectively improving the playback efficiency of video, facilitating popularization and application, and providing good user experience.

FIG. 1 is a schematic diagram of a principle of an application scenario of the present disclosure. As shown in FIG. 1, a system broadcast is triggered to be generated when a screen is off: a terminal monitors whether the screen is in a screen-off state through the system broadcast and determines that the screen enters the screen-locked state if the screen is in the screen-off state. If the system broadcast is turned on, the lock screen play application (Activity) is started. At this time, the terminal will block functions of mobile phone buttons, and then load at least two video files. Then, the terminal determines video information of each video file, the video information including: a video width, a video height, coordinates of an upper left corner of video, and a video volume state: the video volume state including: a mute state and a non-mute state. Then, decoding threads are started which run in parallel, and the video files are converted into corresponding video images according to the video information of each video file, where the number of the decoding threads is consistent with the number of the video files. Finally, the terminal displays the video images on different display areas of the screen, where the number of display areas is consistent with the number of video files. The terminal may respond to a first operation signal input by a user, and control a playback state of any display area to be a full-screen play back state according to the first operation signal, where, when in the full-screen play back state, playing of the video files corresponding to other hidden display areas is paused: respond to a second operation signal input by a user, and switch from the full-screen playback state to a split-screen playback state according to the second operation signal. The terminal may also receive a notification and display the notification in a message bar, where the message bar is located above or below the display areas; and respond to a third operation signal of a user on the message bar, and enter an application interface corresponding to the notification from the screen-locked state according to the third operation signal. The terminal may also respond to a fourth operation signal input by a user, and enter an unlocked state from the screen-locked state according to the fourth operation signal, where the fourth operation signal refers to: a sliding signal that is sensed in a preset area and greater than an unlocking distance; and save current playback addresses, playback progress, and video information of the video files. The terminal may also continue to play the video files according to the saved current playback addresses, playback progress, and video information of the video files when entering the screen-locked state next time.

The above method can be used to implement split-screen play back for lock screen video without changing hardware of a terminal, thereby effectively improving the play back efficiency of the video, facilitating popularization and application, and providing good user experience.

The technical solutions of the present disclosure and how the technical solutions of the application solve the above technical problem are described in detail below with specific embodiments. The following specific embodiments may be combined with each other, and the same or similar concepts or processes may not be repeated in some embodiments. The embodiments of the present disclosure will be described below in combination with the accompanying drawings.

Figure 2:
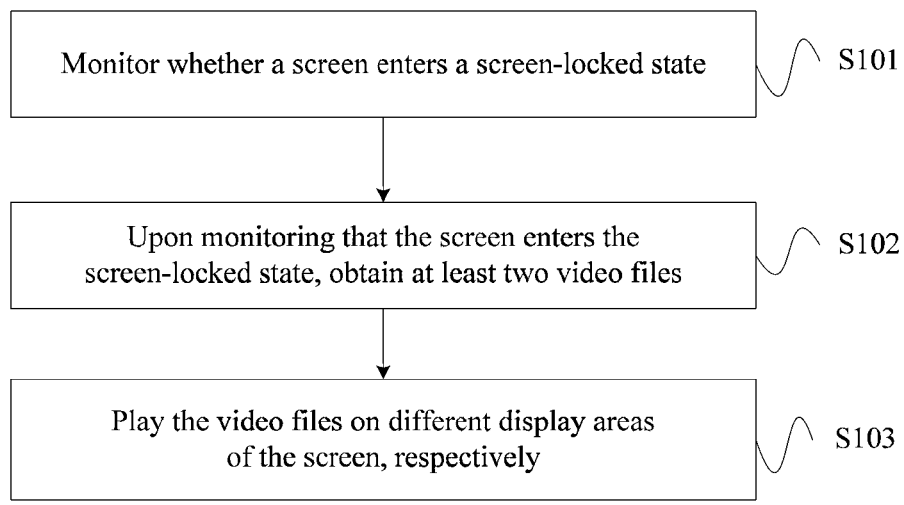
FIG. 2 is a flowchart of a split-screen playback method for lock screen video provided in a first embodiment of the present disclosure.

FIG. 2 is a flowchart of the of a split-screen play back method for lock screen video provided by a first embodiment of the present disclosure. As shown in FIG. 2, the method in the embodiment may include the following steps.

S101: monitor whether a screen enters a screen-locked state.

In the embodiment, a system broadcast is triggered to be generated when the screen is off. A terminal monitors whether the screen is in a screen-off state through the system broadcast, and determines the screen enters the screen-locked state when the screen is in the screen-off state.

S102: upon monitoring that the screen enters the screen-locked state, obtain at least two video files.

In the embodiment, when the screen is in the screen-off state, the system broadcast will be triggered to turn on. A service application running in background will monitor the system broadcast. If the system broadcast is turned on, a lock screen playback application (Activity) will be started. At this time, the terminal will block functions of mobile phone buttons, and then load at least two video files. The embodiment takes four videos as an example, which will not be described later. A method of loading a video may be a user manually selecting a video to be loaded, or may be automatically loading a last played video or a video file under a default path set by a user or the terminal.

It should be noted that this embodiment does not limit the method of obtaining a video, and those skilled in the art can add or remove a method of obtaining a video according to an actual situation. The method of obtaining a video may be a user manually selecting a video to be loaded, or may be automatically loading a last played video, or a video file under a default path set by a user or the terminal.

S103: play the video files on different display areas of the screen, respectively.

In the embodiment, firstly, a terminal determines video information of each video file, the video information including: a video width, a video height, coordinates of an upper left corner of video, and a video volume state: the video volume state including: a mute state and a non-mute state. Then, decoding threads are started which run in parallel, and the video files are converted into corresponding video images according to the video information of each video file, where a number of the decoding threads is consistent with a number of the video files. Finally, the video images are displayed on the different display areas of the screen, where the number of the display areas is consistent with the number of the video files.

Specifically, video decoding and play back are performed in threads, usually one decoding thread and one display thread. Then, for the play back of multiple videos, a new decoding thread will be started every time an additional video is decoded. In addition, a thread is added to display the total screen. When there are multiple videos, all audio and video related variables are extracted, and a new structure videoInfo (video information) is defined. The video information includes variables such as desWidth, desWeight, x, y, mute, where desWidth represents the video width corresponding to the video, desHeight represents the video height corresponding to the video, x represents a horizontal axis coordinate corresponding to the upper left corner of the video, y represents a vertical axis coordinate corresponding to the upper left corner of the video, and mute represents a volume state corresponding to the video, for example, whether it is muted or not. In addition, a definition of allframe (allframe) is added, which is used to store a whole large image and finally display in a window. For example, a size of a display window is 1280*720. In video playback, if there are two or three or four videos, the parameters such as image width, height and position in the videoInfo of each video will be assigned according to the number of videos, so that after decoded, the images will be converted into images with corresponding width and height, or a specific area is specified on the screen to contain several video images. According to display position of each video, current AVFrames (current frames) of the videos are copied to a total AVFrame (current total frame), which is then displayed by calling a Show function. Raw data after decoding is stored in AVFrame. AVFrame is not only an output of decoder during decoding, but also an input of encoder during encoding. Therefore, when using a ffmpeg codec for code stream analysis, AVFrame is a very important structure. When a new image needs to be displayed, the display thread performs assignment for a next frame of video (preFrame), so as to implement a flow playback of video. Since the playback of each video is independent of each other, the preFrame of each video is in a different thread. Therefore, a lock is needed for protection during playback. A mutual exclusion lock called videoMutex is used. At the same time, whether to mute can also be set for each video as needed, so as to achieve an effect of simultaneous playback.

Optionally, converting the video files into the corresponding video images according to the video information of each video file includes: registering a ffmpeg codec; inputting a file list corresponding to the video files: starting a mutual exclusion lock used to lock control instructions of different decoding threads: opening all the video files through the decoding threads running in parallel: releasing the mutual exclusion lock: encapsulating a frame decoding process of the video files and releasing the ffmpeg codec to obtain the corresponding video images.

Figure 3:
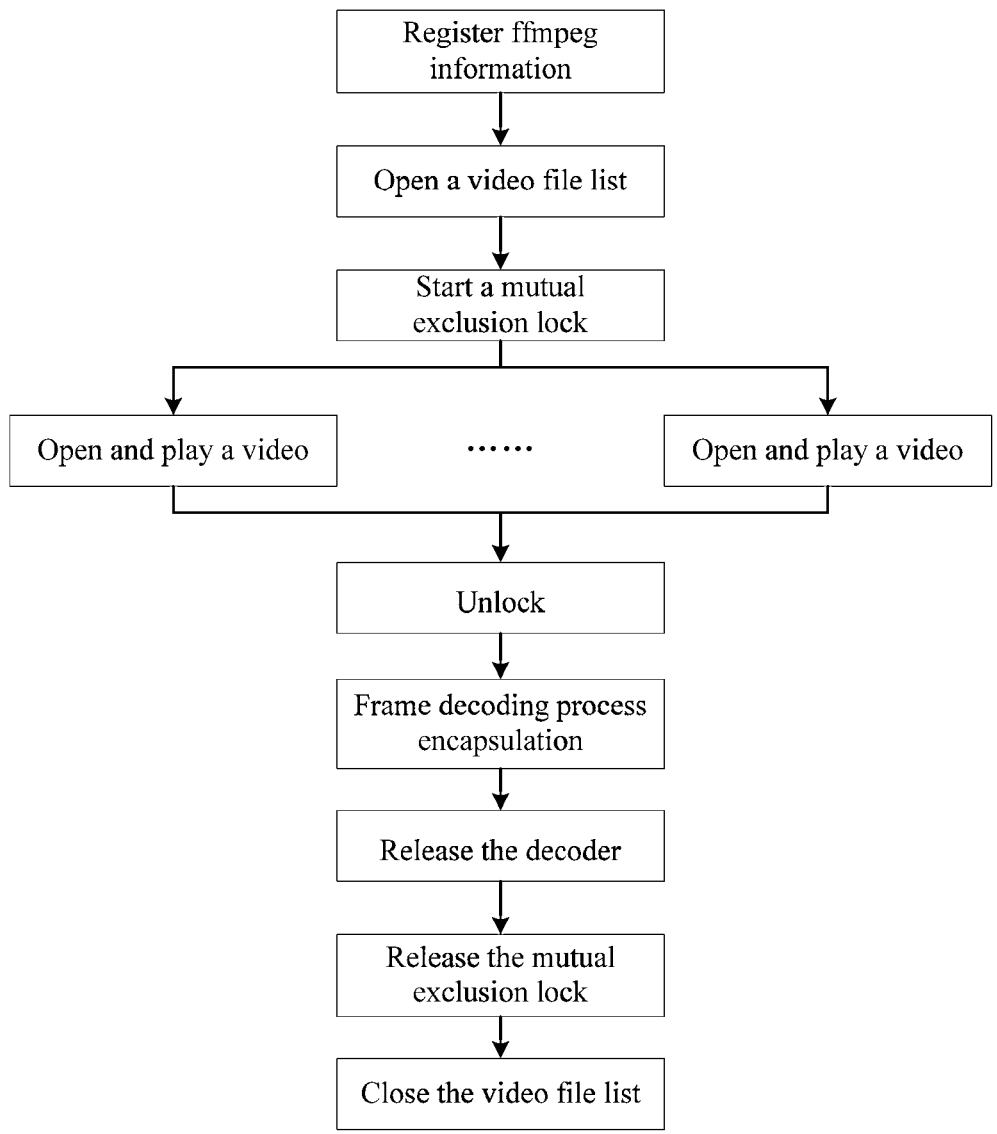
FIG. 3 is a schematic flowchart of decoding threads provided by an embodiment of the present disclosure.

Specifically, FIG. 3 a schematic flowchart of a decoding thread provided by an embodiment of the present disclosure. As shown in FIG. 3, a decoding process provided by the embodiment includes: registering ffmpeg information, opening a video file list, starting a mutual exclusion lock, multi-threaded opening and playing videos, unlocking, frame decoding process encapsulation, releasing the decoder, releasing the mutual exclusion lock, and closing the video file list.

In the embodiment, whether a screen enters a screen-locked state is monitored, at least two video files are obtained upon monitoring that the screen enters the screen-locked state; and the video files are played on different display areas of the screen, respectively, where a number of the display areas is consistent with a number of the video files. Therefore, the present disclosure can implement split-screen playback for lock screen video without changing hardware of a terminal, thereby effectively improving the playback efficiency of the video, facilitating popularization and application, and providing good user experience.

Figure 4:
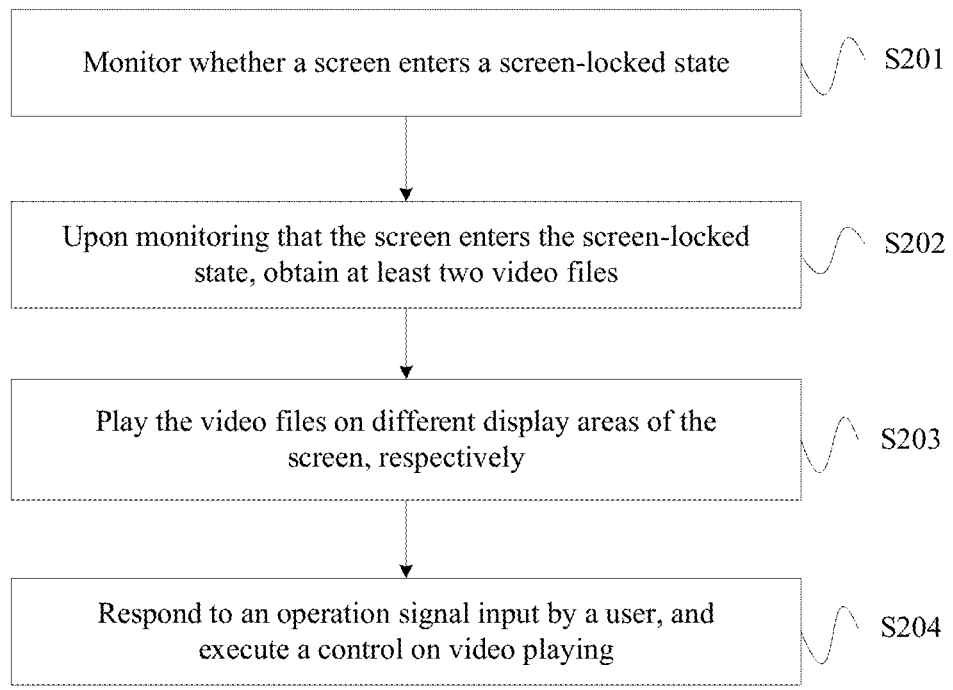
FIG. 4 is a flowchart of a split-screen playback method for lock screen video provided by a second embodiment of the present disclosure.

FIG. 4 is a flowchart of a split-screen playback method for lock screen video provided by a second embodiment of the present disclosure. As shown in FIG. 4, the method in the embodiment may include the following steps.

S201: monitor whether a screen enters a screen-locked state.

S202: upon monitoring that the screen enters the screen-locked state, obtain at least two video files.

S203: play the video files on different display areas of the screen, respectively.

For the technical principle and specific implementation process of steps S201 to S203 in the embodiment, please refer to the related description of steps S101 to S103 in the method shown in FIG. 2, which will not be repeated here.

S204: respond to an operation signal input by a user, and execute a control on video playing.

In the embodiment, after the video files are played on different display areas of the screen respectively, an operation signal input by a user may be responded to, and control may be executed on video playing, so as to improve user experience. In the embodiment, for the audio and video output of multiple videos, in order to optimize an output effect, the device uses dual-channel output for all videos, a volume list and a playback state list are maintained for different threads on a client, respectively, and different default volumes are set, respectively. When there is a video with enlarged display, all other threads are muted and playback is paused, and the file paths, progress and volume information of the paused videos are saved. In the embodiment, in order to make lock screen playback experience better, a minimum change principle is followed when setting the playback positions of the videos, a largest blank area is found as a maximum size of a player without changing an original layout, and the area is evenly divided and distributed according to the number of video files. A sliding for unlocking can be detected anywhere on a screen outside the playback area. On an unlocked interface, a call may be made, and a camera may be turned on. Operations, such as double-click, single-click, long-press, may also be detected. The camera is turned on by a double-click on a home button. Single-click on the home button is blocked. In a current version, the home button cannot be directly blocked and the lock screen Activity (lock screen application) is set as Launcher (desktop) to avoid this problem. A real launcher is started when an unlocking gesture is detected. At the same time, a dynamic layout function is also provided, which refers to a previous software development kit (SDK). Movement of a player interface on the screen may be supported, and the player interface may be dragged to move within the Activity interface like an App (application). When the interface is dragged, the screen interface will be re-layout.

Figure 5:
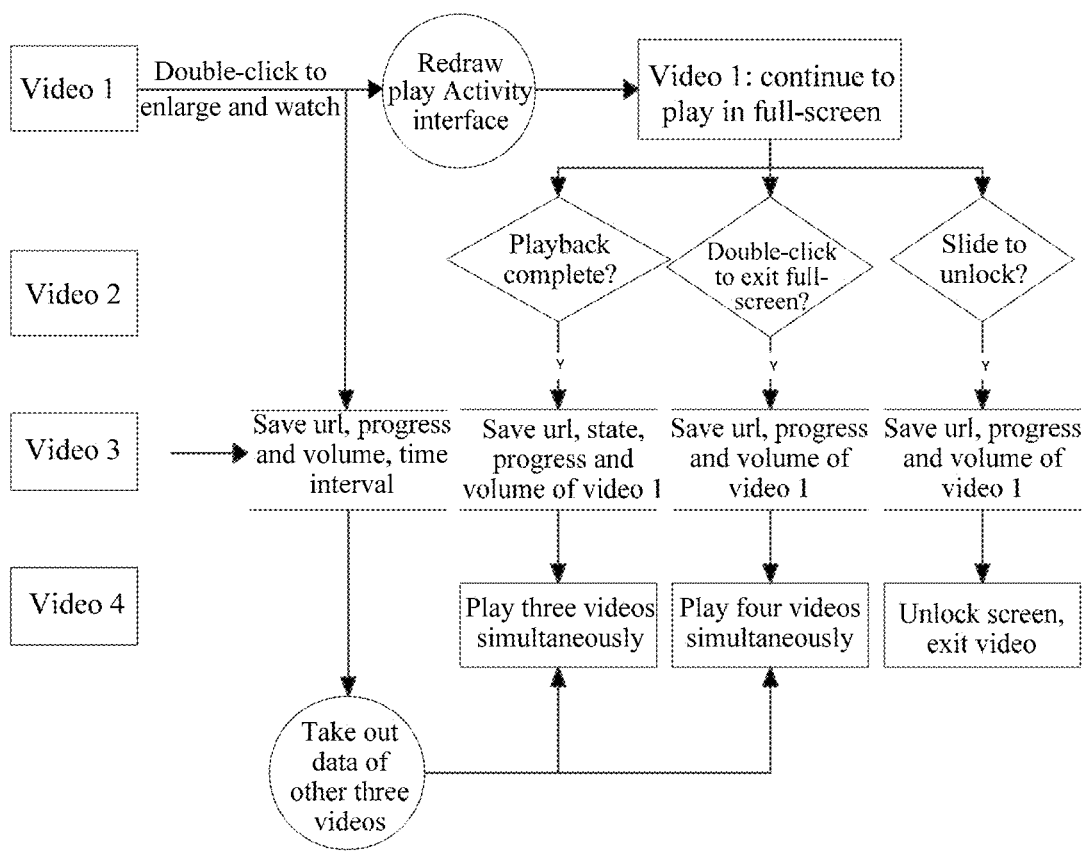
FIG. 5 is a schematic flowchart of full-screen playback provided by an embodiment of the present disclosure.
Figure 6:
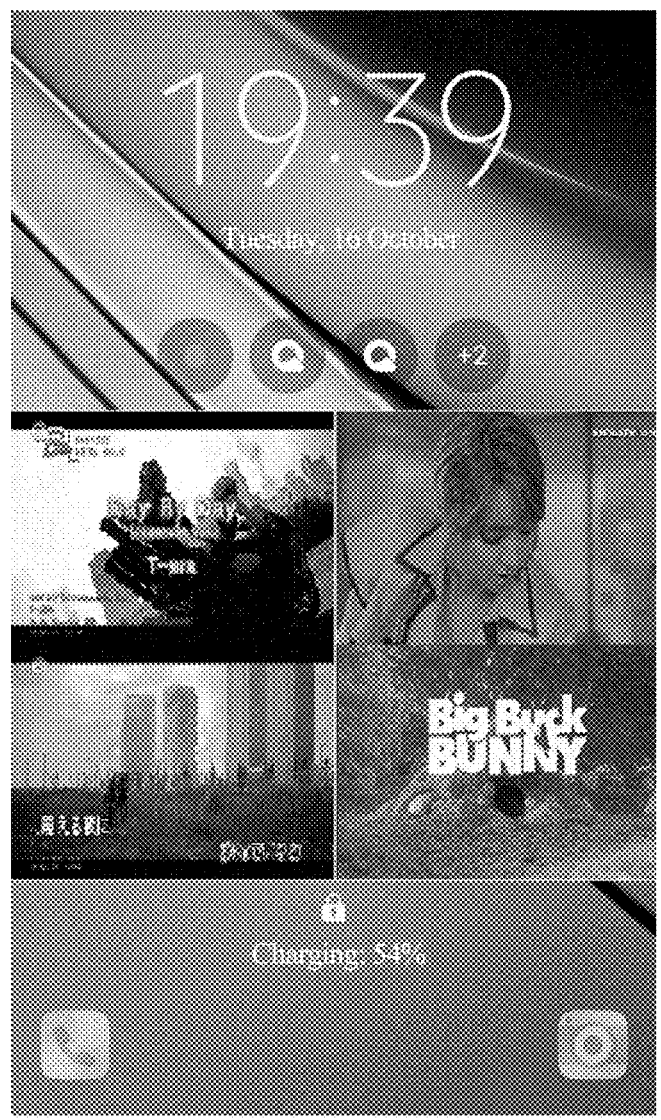
FIG. 6 is a schematic diagram of an effect of split-screen playback provided by an embodiment of the present disclosure.
Figure 7:
FIG. 7 is a schematic diagram of an effect of full-screen play back provided by an embodiment of the present disclosure.

Optionally, a first operation signal input by a user is responded to, and a play back state of any display area may be controlled to be a full-screen play back state according to the first operation signal. When in the full-screen playback state, playing of the video files corresponding to other hidden display areas is paused. A second operation signal input by a user is responded to, and switching from the full-screen playback state to a split-screen playback state is performed according to the second operation signal. Taking an operation signal of a double-click on the screen as an example, FIG. 5 is a schematic flowchart of full-screen playback provided by an embodiment of the present disclosure, FIG. 6 is a schematic diagram of an effect of split-screen play back provided by an embodiment of the present disclosure, and FIG. 7 is a schematic diagram of an effect of full-screen play back provided by an embodiment of the present disclosure.

Optionally, a terminal may receive a notification and display the notification in a message bar: where the message bar is located above or below the display areas; and respond to a third operation signal of a user on the message bar, and enter an application interface corresponding to the notification from the screen-locked state according to the third operation signal.

Optionally, the terminal may respond to a fourth operation signal input by a user, and enter an unlocked state from the screen-locked state according to the fourth operation signal, where the fourth operation signal refers to: a sliding signal that is sensed in a preset area and greater than an unlocking distance; and save current playback addresses, playback progress, and video information of the video files.

Optionally, when the screen-locked state is entered next time, the video files are continued to be played according to the saved current playback addresses, play back progress, and video information of the video files.

In the embodiment, whether a screen enters a screen-locked state is monitored, at least two video files are obtained upon monitoring that the screen enters the screen-locked state, and the video files are played on different display areas of the screen, respectively, where a number of the display areas is consistent with a number of the video files. Therefore, the present disclosure can implement split-screen playback for lock screen video without changing hardware of a terminal, thereby effectively improving the play back efficiency of the video, facilitating popularization and application, and providing good user experience.

In addition, the embodiment can also response to the operation signal input by the user, and execute a control on video playing, so as to improve user experience.

Figure 8:
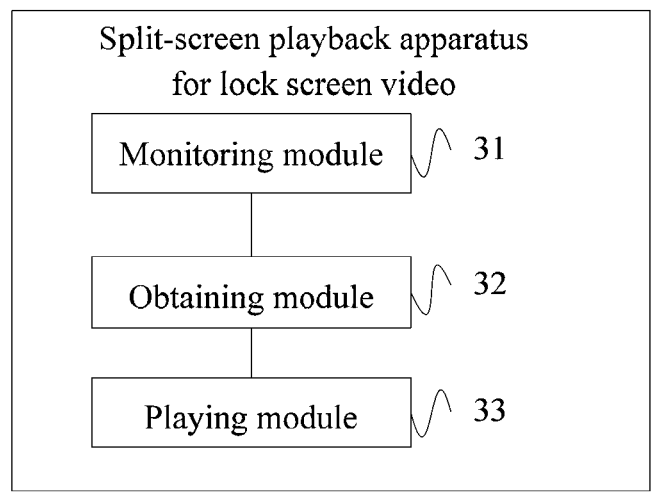
FIG. 8 is a schematic structural diagram of a split-screen play back apparatus for lock screen video provided by a third embodiment of the present disclosure.

FIG. 8 is a schematic structural diagram of a split-screen playback apparatus for lock screen video provided by a third embodiment of the present disclosure. As shown in FIG. 8, the split-screen play back apparatus for lock screen video of the present embodiment may include:

a monitoring module 31, configured to monitor whether a screen enters a screen-locked state;

an obtaining module 32, configured to obtain at least two video files upon monitoring that the screen enters the screen-locked state; and a playing module 33, configured to play the video files on different display areas of the screen: where a number of the display areas is consistent with a number of the video files.

In a possible design, the monitoring module 31 is specifically configured to:

trigger generation of a system broadcast when the screen is off;

monitor whether the screen is in a screen-off state through the system broadcast:

and determine that the screen enters the screen-locked state if the screen is in the screen-off state.

In a possible design, the playback module 33 is specifically configured to:

determine video information of each video file, the video information including: a video width, a video height, coordinates of an upper left corner of video, and a video volume state; the video volume state including: a mute state and a non-mute state;

start decoding threads running in parallel, and convert the video files into corresponding video images according to the video information of each video file; where a number of the decoding threads is consistent with the number of the video files; and display the video images on the different display areas of the screen.

In a possible design, converting the video files into corresponding video images according to the video information of each video file comprises:
- registering a ffmpeg codec;
- inputting a file list corresponding to the video files;
- starting a mutual exclusion lock used to lock control instructions of different decoding threads;
- opening all the video files through the decoding threads running in parallel;
- releasing the mutual exclusion lock;
- encapsulating a frame decoding process of the video files and releasing the ffmpeg codec to obtain the corresponding video images.

The split-screen playback apparatus for lock screen video of this embodiment can execute the technical solution in the method shown in FIG. 2. For its specific implementation process and technical principle, please refer to the relevant description in the method shown in FIG. 2, which will not be repeated here.

In the embodiment, whether a screen enters a screen-locked state is monitored, at least two video files are obtained upon monitoring that the screen enters the screen-locked state, and the video files are played on different display areas of the screen, respectively, where a number of the display areas is consistent with a number of the video files. Therefore, the present disclosure can implement split-screen playback for lock screen video without changing hardware of a terminal, thereby effectively improving the playback efficiency of the video, facilitating popularization and application, and providing good user experience.

Figure 9:
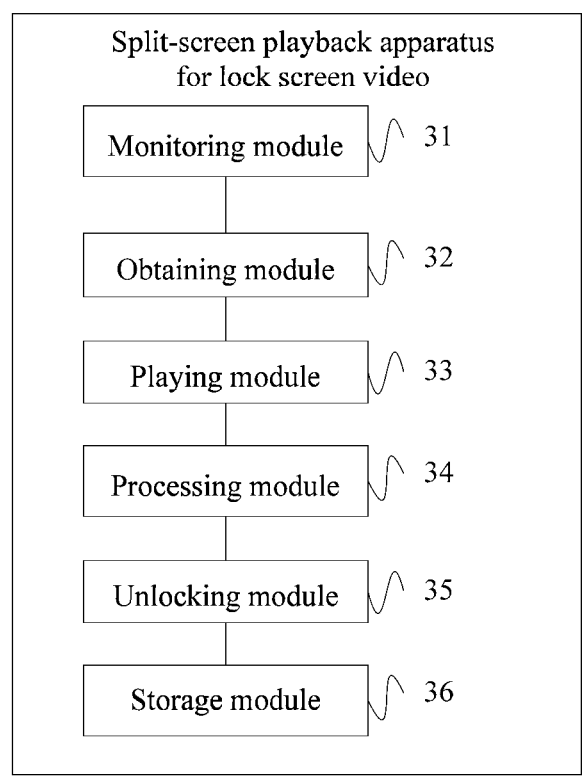
FIG. 9 is a schematic structural diagram of a split-screen play back apparatus for lock screen video provided by a fourth embodiment of the present disclosure.

FIG. 9 is a schematic structural diagram of a split-screen play back apparatus for lock screen video provided by a fourth embodiment of the present disclosure. As shown in FIG. 9, on the basis of the apparatus shown in FIG. 8, the split-screen play back apparatus for lock screen video of the present embodiment may further include:
- a processing module 34, specifically configured to: respond to a first operation signal input by a user, and control a playback state of any display area to be a full-screen playback state according to the first operation signal: where when in the full-screen play back state, playing of the video files corresponding to other hidden display areas is paused: respond to a second operation signal input by a user, and switch from the full-screen playback state to a split-screen play back state according to the second operation signal In a possible design, the processing module 34 is specifically configured to:
- receive a notification and display the notification in a message bar: where the message bar is located above or below the display areas; and
- respond to a third operation signal of a user on the message bar, and enter an application interface corresponding to the notification from the screen-locked state according to the third operation signal.

In a possible design, further include:
- an unlocking module 35, configured to respond to a fourth operation signal input by a user, and enter an unlocked state from the screen-locked state according to the fourth operation signal: where the fourth operation signal refers to: a sliding signal that is sensed in a preset area and greater than an unlocking distance; and
- a storage module 36, configured to save current playback addresses, play back progress and video information of the video files.

In a possible design, the playing module 33 is further configured to:
- when the screen-locked state is entered next time, continue to play the video files according to the saved current play back addresses, playback progress, and video information of the video files.

The split-screen playback apparatus for lock screen video of the embodiment can execute the technical solutions in the method shown in FIG. 2 and FIG. 4. For the specific implementation process and technical principle, please refer to the related description in the method shown in FIG. 2 and FIG. 4, which will not be repeated here.

In the embodiment, whether a screen enters a screen-locked state is monitored, at least two video files are obtained upon monitoring that the screen enters the screen-locked state, and the video files are played on different display areas of the screen, respectively, where a number of the display areas is consistent with a number of the video files. Therefore, the present disclosure can implement split-screen playback for lock screen video without changing hardware of a terminal, thereby effectively improving the playback efficiency of the video, facilitating popularization and application, and providing good user experience.

In addition, the embodiment may also respond to an operation signal input by a user, and execute a control on video playing, so as to improve the user experience.

Figure 10:
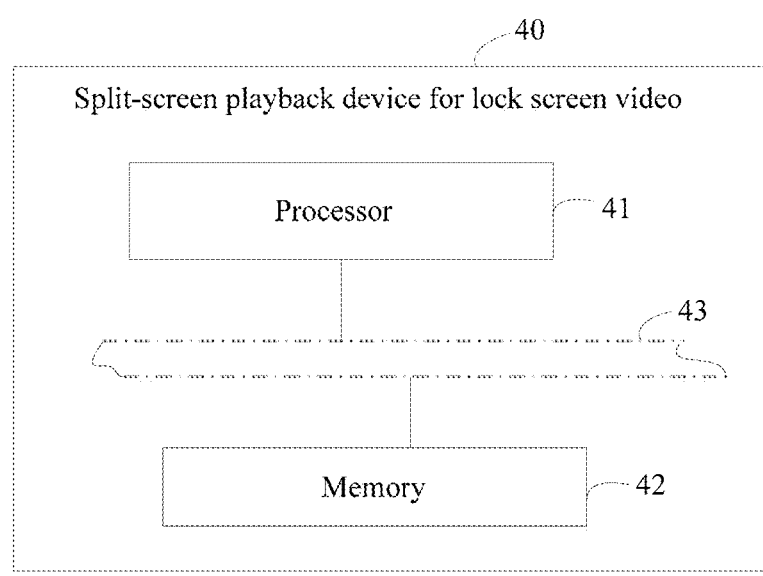
FIG. 10 is a schematic structural diagram of a split-screen play back device for lock screen video provided by a fifth embodiment of the present disclosure.

FIG. 10 is a schematic structural diagram of a split-screen play back device for lock screen video provided by a fifth embodiment of the present disclosure. As shown in FIG. 10, the split-screen playback device 40 for lock screen video of the present embodiment may include a processor 41 and a memory 42.

The memory 42 is configured to store a program: the memory 42 may include a volatile memory, such as a random access memory (RAM), such as a static random access memory (SRAM), a double data rate synchronous dynamic random access memory (DDR SDRAM); the memory may also include a non-volatile memory, such as a flash memory. The memory 42 is configured to store computer programs (such as application programs and functional modules realizing the above methods), computer instructions, etc., the above computer programs, computer instructions, etc. may be partitioned and stored in one or more memories 42, and the above computer programs, computer instructions, data, etc. can be called by the processor 41.

The processor 41 is configured to execute the computer program stored in the memory 42 to implement the steps of the method according to the above embodiments.

For details, please refer to the related description in the previous method embodiments.

The processor 41 and the memory 42 may be independent structures or an integrated structure. When the processor 41 and the memory 42 are independent structures, the memory 42 and the processor 41 may be coupled through a bus 43.

The device of the embodiment can execute the technical solutions in the method shown in FIG. 2 and FIG. 4. For its specific implementation process and technical principle, please refer to the relevant description in the method shown in FIG. 2 and FIG. 4, which will not be repeated here.

In addition, an embodiment of the present application also provides a computer-readable storage medium having computer execution instructions stored therein. When at least one processor of a user equipment executes the computer execution instructions, the user equipment executes the above various possible methods.

The computer-readable medium includes a computer storage medium and a communication medium, where the communication medium includes any medium that facilitates a transfer of a computer program from one place to another. The storage medium may be any available medium that can be accessed by a general-purpose or special-purpose computer. An illustrative storage medium is coupled to the processor so that the processor can read a computer program from the storage medium. Of course, the storage medium may also be an integral part of the processor. The processor and the storage medium may be located in an ASIC. In addition, the ASIC may be located in the user equipment. Of course, the processor and the storage medium may also exist in a communication device as separate components.

The application also provides a program product, the program product includes a computer program stored in a readable storage medium, at least one processor of a device can read the computer program from the readable storage medium, and at least one processor executes the computer program so that the device implements any of the methods of the above embodiments of the present disclosure.

Those skilled in the art can understand that all or part of the steps to implement the above method embodiments can be completed by a program instructing related hardware. The above program may be stored in a computer-readable storage medium. When the program is executed, the steps including the above method embodiments are executed; and the above storage medium includes a ROM, a RAM, a magnetic disk or an optical disk and other media that can store program code.

Finally, it should be noted that the above embodiments are only used to illustrate the technical solutions of the present disclosure, but not to limit it; although the present disclosure has been described in detail with reference to the above embodiments, those skilled in the art should understand that they can still modify the technical solutions described in the above embodiments, or equivalently replace some or all of the technical features. However, these modifications or substitutions do not make the essence of the corresponding technical solutions separate from the scope of the technical solutions of the embodiments of the present disclosure.

What is claimed is:

1. A split-screen playback method for lock screen video, comprising:
   monitoring whether a screen enters a screen-locked state;
   upon monitoring that the screen enters the screen-locked state, obtaining at least two video files; and
   playing the video files on different display areas of the screen, respectively;
   wherein playing the video files on different display areas of the screen, respectively, comprises:
   determining video information of each video file, the video information comprising a video width, a video height, coordinates of an upper left corner of video, and a video volume state, the video volume state comprising a mute state and a non-mute state;
   starting decoding threads running in parallel, and converting the video files into corresponding video images according to the video information of each video file, wherein a number of the decoding threads is consistent with the number of the video files; and
   displaying the video images on the different display areas of the screen.

2. The method according to claim 1, wherein monitoring whether the screen enters the screen-locked state comprises:
   triggering generation of a system broadcast when the screen is off; and
   monitoring whether the screen is in a screen-off state through the system broadcast; and
   determining that the screen enters the screen-locked state if the screen is in the screen-off state.

3. The method according to claim 1, wherein
   converting the video files into the corresponding video images according to the video information of each video file comprises:
   registering a ffmpeg codec;
   inputting a file list corresponding to the video files;
   starting a mutual exclusion lock used to lock control instructions of different decoding threads;
   opening all the video files through the decoding threads running in parallel;
   releasing the mutual exclusion lock; and
   encapsulating a frame decoding process of the video files and releasing the ffmpeg codec to obtain corresponding video images.

4. The method according to claim 1, after playing the video files on different display areas of the screen, respectively, further comprising:
   receiving a notification and displaying the notification in a message bar; wherein the message bar is located above or below the display areas;
   responding to a third operation signal of a user on the message bar, and entering an application interface corresponding to the notification from the screen-locked state according to the third operation signal.

5. The method according to claim 1, after playing the video files on different display areas of the screen, respectively, further comprising:
   responding to a fourth operation signal input by a user, and entering an unlocked state from the screen-locked state according to the fourth operation signal; wherein the fourth operation signal refers to: a sliding signal that is sensed in a preset area and greater than an unlocking distance; and
   saving current playback addresses, playback progress, and video information of the video files.

6. The method of claim 5, further comprising:
   when entering the screen-locked state next time, continuing to play the video files according to the saved current playback addresses, playback progress, and video information of the video files.

7. The method according to claim 1, after playing the video files on different display areas of the screen, respectively, further comprising:
   responding to a first operation signal input by a user, and controlling a playback state of any display area to be a full-screen playback state according to the first operation signal, wherein, when in the full-screen playback state, playing of the video files corresponding to other hidden display areas is paused; and
   responding to a second operation signal input by the user, and switching from the full-screen playback state to a split-screen playback state according to the second operation signal.

8. A split-screen playback apparatus for lock screen video, comprising: a memory and a processor;
   wherein, the memory has executable instructions stored therein; and
   the processor, when executing the executable instructions, is configured to:
   monitor whether a screen enters a screen-locked state;
   obtain at least two video files upon monitoring that the screen enters the screen-locked state; and
   play the video files on different display areas of the screen; wherein a number of the display areas is consistent with a number of the video files;

wherein the processor is further configured to:
determine video information of each video file, the video information comprising: a video width, a video height, coordinates of an upper left corner of video, and a video volume state; the video volume state comprising: a mute state and a non-mute state;
start decoding threads running in parallel, and convert the video files into corresponding video images according to the video information of each video file; wherein a number of the decoding threads is consistent with the number of the video files; and
display the video images on the different display areas of the screen.

9. The apparatus according to claim 8, wherein the processor is configured to:
trigger generation of a system broadcast when the screen is off; and
monitor whether the screen is in a screen-off state through the system broadcast;
and determine that the screen enters the screen-locked state if the screen is in the screen-off state.

10. The apparatus according to claim 8, wherein the processor is further configured to:
register a ffmpeg codec;
input a file list corresponding to the video files;
start a mutual exclusion lock used to lock control instructions of different decoding threads;
open all the video files through the decoding threads running in parallel;
release the mutual exclusion lock;
encapsulate a frame decoding process of the video files and release the ffmpeg codec to obtain corresponding video images.

11. The apparatus according to claim 8, wherein the processor is further configured to:
respond to a first operation signal input by a user, and control a playback state of any display area to be a full-screen playback state according to the first operation signal; wherein when in the full-screen playback state, playing of the video files corresponding to other hidden display areas is paused;
respond to a second operation signal input by the user, and switch from the full-screen playback state to a split-screen playback state according to the second operation signal.

12. The apparatus according to claim 8, wherein the processor is further configured to:
receive a notification and display the notification in a message bar; wherein the message bar is located above or below the display areas;
respond to a third operation signal of a user on the message bar, and enter an application interface corresponding to the notification from the screen-locked state according to the third operation signal.

13. The apparatus according to claim 8, wherein the processor is further configured to:
respond to a fourth operation signal input by a user, and enter an unlocked state from the screen-locked state according to the fourth operation signal; wherein the fourth operation signal refers to: a sliding signal that is sensed in a preset area and greater than an unlocking distance; and
save current playback addresses, playback progress and video information of the video files.

14. The apparatus according to claim 13, wherein the processor is further configured to:
when the screen-locked state is entered next time, continue to play the video files according to the saved current playback addresses, playback progress, and video information of the video files.

15. A non-transitory computer-readable storage medium with a computer program stored thereon, wherein when the program is executed by a processor, following operations are implemented:
monitoring whether a screen enters a screen-locked state;
upon monitoring that the screen enters the screen-locked state, obtaining at least two video files; and
playing the video files on different display areas of the screen, respectively;
wherein a number of the display areas is consistent with a number of the video files;
wherein, after playing the video files on different display areas of the screen, respectively, the following operations are further implemented:
receiving a notification and displaying the notification in a message bar; wherein the message bar is located above or below the display areas; and
responding to a third operation signal of a user on the message bar, and entering an application interface corresponding to the notification from the screen-locked state according to the third operation signal.

* * * * *